US010785985B2

(12) United States Patent
Griebel et al.

(10) Patent No.: US 10,785,985 B2
(45) Date of Patent: Sep. 29, 2020

(54) SOFT SHAPED TORTILLAS

(71) Applicant: GENERAL MILLS, INC., Minneapolis, MN (US)

(72) Inventors: Jonathan M. Griebel, Maple Grove, MN (US); Vincent Paul Sommer, Northfield, MN (US); Ivan Hajovy, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 797 days.

(21) Appl. No.: 14/476,996

(22) Filed: Sep. 4, 2014

(65) Prior Publication Data
US 2014/0377424 A1 Dec. 25, 2014

Related U.S. Application Data

(62) Division of application No. 12/429,594, filed on Apr. 24, 2009, now abandoned.

(51) Int. Cl.
*A21D 13/42* (2017.01)
*A21D 8/06* (2006.01)
*A23P 30/10* (2016.01)
*A21D 13/33* (2017.01)
*A23L 7/13* (2016.01)

(52) U.S. Cl.
CPC ............. *A21D 13/42* (2017.01); *A21D 8/06* (2013.01); *A21D 13/33* (2017.01); *A23L 7/13* (2016.08); *A23P 30/10* (2016.08)

(58) Field of Classification Search
CPC .......... A21D 13/42; A21D 8/06; A21D 13/33; A23L 7/13; A23P 30/10
See application file for complete search history.

(56) References Cited

U.S. PATENT DOCUMENTS

| 3,794,455 A | * | 2/1974 | Heiderpriem | ......... A21B 3/132 |
| | | | | 425/403 |
| 3,930,049 A | | 12/1975 | Mattson | |
| 3,963,402 A | | 6/1976 | Berta | |
| 4,055,670 A | | 10/1977 | Belmont | |
| D251,396 S | | 3/1979 | Hutchinson | |
| D251,816 S | | 5/1979 | Majeski | |
| 4,313,964 A | | 2/1982 | Dembecki | |
| 4,381,837 A | | 5/1983 | Cortopassi | |

(Continued)

FOREIGN PATENT DOCUMENTS

| CA | 2060464 A1 * | 4/1993 | ............. A21B 3/132 |
| WO | WO 9215199 A1 * | 9/1992 | ............... A21B 3/13 |
| WO | WO-2004/037016 | 5/2004 | |

OTHER PUBLICATIONS

"How to Make Tortillas" Oct. 17, 2006 http://lagringasblogicito.blogspot.com/2006/10/how-to-make-tortillas.html.*
(Continued)

*Primary Examiner* — Viren A Thakur
(74) *Attorney, Agent, or Firm* — Diederiks & Whitelaw, PLC; Rachel A. Kahler

(57) ABSTRACT

The present invention encompasses edible carriers for foods that are soft but still hold a preformed shape. Specifically encompassed are soft shaped tortilla products that can be used to hold food fillings. Exemplary shapes and sizes are provided for the products. Also encompassed are methods of making, packaging, and using the products.

13 Claims, 6 Drawing Sheets

(56) References Cited

U.S. PATENT DOCUMENTS

| | | | |
|---|---|---|---|
| D277,234 S | 1/1985 | Bank | |
| D278,199 S | 4/1985 | Richards | |
| 4,735,811 A | 4/1988 | Skarra et al. | |
| 4,781,932 A | 11/1988 | Skarra et al. | |
| 4,822,626 A * | 4/1989 | Spanier | A23K 1/003 |
| | | | 426/293 |
| 4,896,820 A | 1/1990 | Harrington | |
| 4,915,964 A | 4/1990 | Smietana | |
| 4,929,458 A | 5/1990 | Smietana | |
| 5,002,783 A | 3/1991 | Ruiz | |
| 5,203,493 A | 4/1993 | Moody | |
| D335,758 S | 5/1993 | Stickle | |
| D339,899 S | 10/1993 | Kittleson | |
| 5,298,273 A | 3/1994 | Ito | |
| D369,451 S | 5/1996 | Gornet et al. | |
| 5,567,459 A | 10/1996 | Gonzalez-Hernandez et al. | |
| D376,893 S | 12/1996 | Gornet | |
| 5,589,210 A * | 12/1996 | De La Luz Martinez | A21B 2/00 |
| | | | 426/243 |
| 5,626,897 A | 5/1997 | Goldstein | |
| 5,652,010 A | 7/1997 | Gimmler et al. | |
| D392,786 S | 3/1998 | Kieser | |
| D393,136 S | 4/1998 | Gornet | |
| 5,756,976 A | 5/1998 | Akasaka | |
| 5,759,599 A * | 6/1998 | Wampler | A21D 13/08 |
| | | | 426/241 |
| D402,085 S | 12/1998 | Gornet | |
| 5,993,871 A | 11/1999 | Beehler | |
| 5,996,476 A | 12/1999 | Schultz | |
| 6,123,973 A * | 9/2000 | Kuhn | A21D 2/14 |
| | | | 426/532 |
| 6,245,374 B1 | 6/2001 | Thomas et al. | |
| 6,746,701 B2 | 6/2004 | Kashou et al. | |
| D515,274 S | 2/2006 | Griebel et al. | |
| D516,275 S | 3/2006 | Anaya | |
| 7,008,655 B1 * | 3/2006 | Aslanis | A21B 5/026 |
| | | | 426/100 |
| D590,126 S | 4/2009 | Kovich et al. | |
| 2002/0168453 A1 | 11/2002 | McCutchan | |
| 2004/0058048 A1 | 3/2004 | Chedid et al. | |
| 2004/0071854 A1 | 4/2004 | Chedid et al. | |
| 2005/0048182 A1 * | 3/2005 | King | A21C 15/007 |
| | | | 426/549 |
| 2005/0142273 A1 * | 6/2005 | Schellhaass | A21D 8/02 |
| | | | 426/549 |
| 2005/0281921 A1 * | 12/2005 | Langston | A23L 3/10 |
| | | | 426/120 |
| 2006/0147587 A1 | 7/2006 | Kovich et al. | |
| 2006/0216378 A1 * | 9/2006 | Boscolo | A21B 5/026 |
| | | | 426/94 |
| 2010/0272863 A1 | 10/2010 | Griebel et al. | |

OTHER PUBLICATIONS

Machine Translation of WO9215199—obtained Dec. 2, 2016.*
Formal Translation of WO9215199 to Nockemann. May 2016.*
Bello A.B., et al. "Methods to Prepare and Evaluate Wheat Tortillas" Cereal Foods World, 1991 (Year: 1991).*
"American Hits", Oct. 30, 2007, http://www.salomon-online.com/p3filesen/produkte/americanhits.shtml.
"Chili in Tortilla Bowls" published Oct. 21, 2006, http://www.favoritebrandrecipes.com/Recipes/335/1531521335.htm.
How to make Really Good Soft Taco Shells, Jul. 21, 2007, http://forums.macresource.com/read.php?1,330158,330263.
"Mushrooms in Garlic Sauce, Served in a Soft Tortilla Shell" Apr. 27, 2006, http://www.foodnetwork.com/recipes/mushrooms-in-garlic-sauce-served-in-a-soft-tortilla-shell-recipe/index.html.
"Ortega" Published Dec. 23, 2007, http://web.archive.org/web/20071228042139/http://www.ortega.com/products/dinner_kits.asp.
"Rachel Ray Show", Jul. 3, 2007, http://www.rachaelrayshow.com/food/recipes/healthy-tortilla-ice-cream-bowls/.
"The Cook's Thesaurus" Jan. 30, 2008, http://web.archive.org/web/20080130010346/http://foodsubs.com/Flatbread.html.
The Revolutionary New Fast Food Concept From Down Under, Xcitetech Technology Solutions, Inc., 2002, http://excitetech.com/TheWalkAboutConeDocV7.o.pdf, brochure.
Pizzacona, Oct. 17, 2007, http://www.crispycones.com/crispy/menu.htm.
The Nibble, Mar. 12, 2009, Tumaro's Tortillas, Gourmet for Sandwich Wraps, Mexican Recipes & Desserts; http://www.thenibble.com/reviews/main/breadstuffs/tumaros-tortillas.asp.
Clark, Chefs and Food Scientists Develop 'grab and go' foods, Food Sci. & Tech Abs. 2007, Dialog Accession No. 01077407.
CrispyCones, Oct. 17, 2007, http://www.crispycones.com/crispy/faq.htm.
EEE Cooks: Tortilla Shell (Recipe), Mar. 12, 2009: http://www.eeecooks.com/recipes/2004/02/17/shell.
GoogleGroups, May 1999, rec.food.cooking, http://groups.google.com/group/rec.food.cooking/browse_thread/thread/25cf043af2ac4457/7cb26bbc141f38fe?hl=en&ie=UTF-8&oe=UTF-8&q=orte.
Hollingsworth, Pierce, "One-handed Cuisine and Other Business Trends to Watch", Food Technology; v. 56:4 p. 18 (Apr. 2002) abstract.
Mintel gnpd, "Crispy Tacho Shells", http://www.gnpd.com, Dec. 30, 2003.

* cited by examiner

SOFT SHAPED TORTILLAS

CROSS REFERENCE TO RELATED APPLICATION

This application is a Divisional of U.S. patent application Ser. No. 12/429,594 filed Apr. 24, 2009, the entire disclosure of which is incorporated herein by reference.

FIELD OF THE INVENTION

The present invention relates to edible holders for foods that are soft but still retain a preformed shape. More specifically, the present invention relates to soft shaped tortilla products, that can be used to hold various edible fillings, and to kits comprising a packaged multiplicity of soft shaped tortilla base pieces. Also related are methods of making, packaging, and using said products.

BACKGROUND OF THE INVENTION

Consumers are searching for healthy and yet convenient food options, avoiding foods laden with excess fats. There is a movement away from unhealthy choices such as crispy deep fried foods. As healthier options, low fat options such as Lebanese breads and pita pockets are used as a carrier for toppings or sandwich ingredients. Yet, they can be too thick, and are likely to break while consumers attempt to fold them into shapes that are convenient to hold and carry. They also show a limited shelf life, and can dry out quickly due to their formulation. Mountain breads can (flat square breads sold in Australia) can also be used, but are more suitable for lunch more than dinner. Also, they are too thin to be used with sauces, and show a limited shelf life. Naans and chapatis are exotic choices more suitable for a main meal than as a lunchtime wrap. In addition, they tend to be inflexible, too small, and high in fat.

By comparison, tortillas are shelf stable, highly soft and flexible, and can fold and bend without breaking. The term "tortilla" is used herein to refer to a Mexican style tortilla, i.e., a generally flat unleavened cooked flexible pan baked dough product generally circular in shape such as from a corn masa dough ("tortilla de maíz") or from a wheat dough ("tortilla de harina"). The two versions of the Mexican tortilla have different textures owing to the grains from which they originate. The maize version is somewhat thicker and heartier in texture, while the wheat version is less easily broken, due to its elevated gluten content, and therefore often larger in circumference. Tortillas are suitable for lunch and dinner, with a unique taste and texture compared to other forms of bread. However despite these advantages, consumers have difficulties "managing" a tortilla. The amount of filling is often miscalculated while folding, sealing and holding can be a challenge. As such, tortillas can be inconvenient, messy, and frustrating, especially for children and their parents. While the art includes moulding precooked tortillas by heating in a microwave, this produces an unsatisfactory product that fails to hold its shape and lacks a true baked texture. Microwaving a precooked tortilla is inadequate for setting the protein structure in the tortilla to form a shape and relies upon drying to form shaped article. With this method, one is forced to overcook the tortilla to produce a hard (e.g., cardboard-like) and excessively tough result.

Thus, there is a need in the art for a soft shaped tortilla product that is easy to use, less messy, delicious to eat, and healthier than other options. Also, there is a need in the art for methods for manufacturing and using such a product.

BRIEF SUMMARY OF THE INVENTION

The invention generally encompasses a low fat shelf stable soft tortilla fabricated from a Mexican tortilla such as a chemically leavened cooked cereal dough that is formed into a variety of thin walled rigid three dimensional shapes that are rigid yet soft and flexible and which are useful for edible containers of loose particulate food stuffing, and wherein the shape is other than (a) flat, (b) flat or in the shape of a cup or bowl, (c) flat or boat/canoe shaped or (d) flat, in the shape of a cup or bowl or boat/canoe shaped.

In a particular aspect, the invention encompasses a soft shaped tortilla that is formed into shape for holding fillings, wherein the shape is other than (a) flat or (b) flat or boat/canoe shaped, flat, and wherein the final moisture content of the tortilla is between about 23% to about 25%.

In one aspect, the tortilla is formed to hold the shape of a cup or bowl.

In other aspects, the tortilla is formed into the shape of a U- or square bottomed shaped taco shell, boat/canoe, pita, flower, pie, tube, envelope, pod, bun, or cone. (square bottomed)

In still other aspects, the tortilla comprises a flat bottom and sealed sides.

In yet other aspects, the tortilla comprises an edible string.

The invention also generally encompasses a method of making a soft tortilla which is formed into a shape, wherein the shape is other than flat.

In a first specific aspect, the invention encompasses a method of producing a soft shaped tortilla, comprising: pressing raw tortilla dough into a mould, and heating the dough in the mould without deep fat frying until the dough is at least substantially cooked and formed into the shape of the mould.

In a second specific aspect, the invention encompasses a method of producing a soft shaped tortilla, comprising: pressing raw tortilla dough into a mould, heating the dough without deep fat frying long enough to form the dough into a rigid article conforming to the shape of the mould, removing the shaped dough from the mould, and heating the shaped dough (e.g., in an oven or other heating device) until fully cooked.

In a third specific aspect, the invention encompasses a method of producing a soft shaped tortilla, comprising: heating flattened tortilla dough until fully cooked, pressing the preheated/precooked tortilla into a mould while still warm and pliable, and cooling the tortilla to set the tortilla into the shape of the mould.

In a fourth specific aspect, the invention encompasses a method of producing a soft shaped tortilla, comprising: rolling raw tortilla dough into a sheet, pressing the sheet into a mould, heating the dough long enough to form into the shape of the mould, removing the shaped dough from the mould, and heating the shaped dough until fully cooked.

In a fifth specific aspect, the invention encompasses a method of producing a soft shaped tortilla, comprising: injecting raw tortilla dough or batter into a mould, and heating the dough or batter in the mould until it is fully cooked and formed into the shape of the mould.

In a sixth specific aspect, the invention encompasses a method of producing a soft shaped tortilla, comprising: injecting raw tortilla dough or batter into a mould, heating the dough long enough to form into the shape of the mould, removing the shaped dough from the mould, and heating the shaped dough (e.g., in an oven or other heating device] device) until fully cooked.

The method can further comprise causing the dough to rise in an irregular manner so as to cause brown points.

The method can still further comprise using two cooking moulds, wherein the first mould comprises a cavity in the shape of the tortilla product; and the second mould comprises a protrusion shaped to fit into the cavity of the first mould. The moulds can be preheated prior to use.

In its principle article aspect, the present invention provides packaged food articles comprising:
A hermetically sealed food package;
 A quantity of baked soft shaped tortilla pieces disposed therein said soft shaped tortilla pieces having a water activity of 0.88 or less; and,
 A headspace gas having an oxygen level of less than 5%

In another article aspect of the one and same invention, meal kits are provided. The meal kits include meal kit for use in making a Mexican soft shaped tortilla, comprising:
An outer package;
A first soft shaped tortilla base pieces package food article disposed within the outer package including:
A hermetically sealed food package;
A quantity of baked soft shaped tortilla pieces disposed therein said soft shaped tortilla pieces fabricated from a farinaceous dough having a water activity of 0.88 or less; and,
A headspace gas having an oxygen level of less than 5%; and,
A second packaged food article disposed within the outer package that is either a pouch of dry seasoning mixture or a pouch of a wet sauce.

In another article aspect of the one and same invention, methods are provided of preparing a soft shaped tortilla base piece packaged food article, comprising the steps of:
 providing a quantities of a chemically leavened gluten plastic or viscoelastic dough;
 forming the quantities into shaped heat set pieces;
 baking; the shaped heat set pieces to form finished soft shaped tortilla base pieces; and,
 packaging a number of finished soft shaped tortilla base pieces within a modified atmosphere package to form a soft shaped tortilla base piece packaged food article.

While multiple aspects are disclosed, still other aspects of the present invention will become apparent to those skilled in the art from the following detailed description, which shows and describes illustrative embodiments of the invention.

As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE INVENTION

Figure 1:
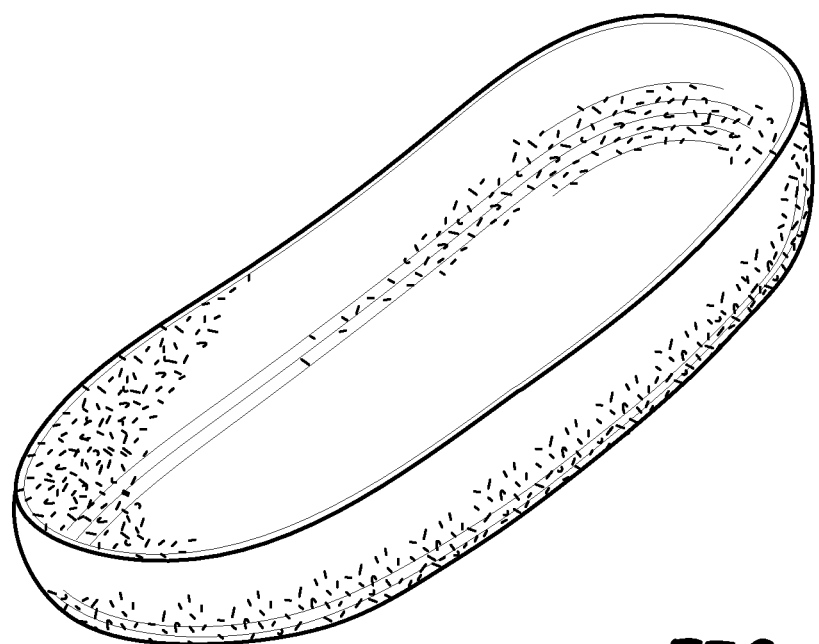
FIG. 1 depicts a model of a canoe/boat shaped soft tortilla.
Figure 1A:
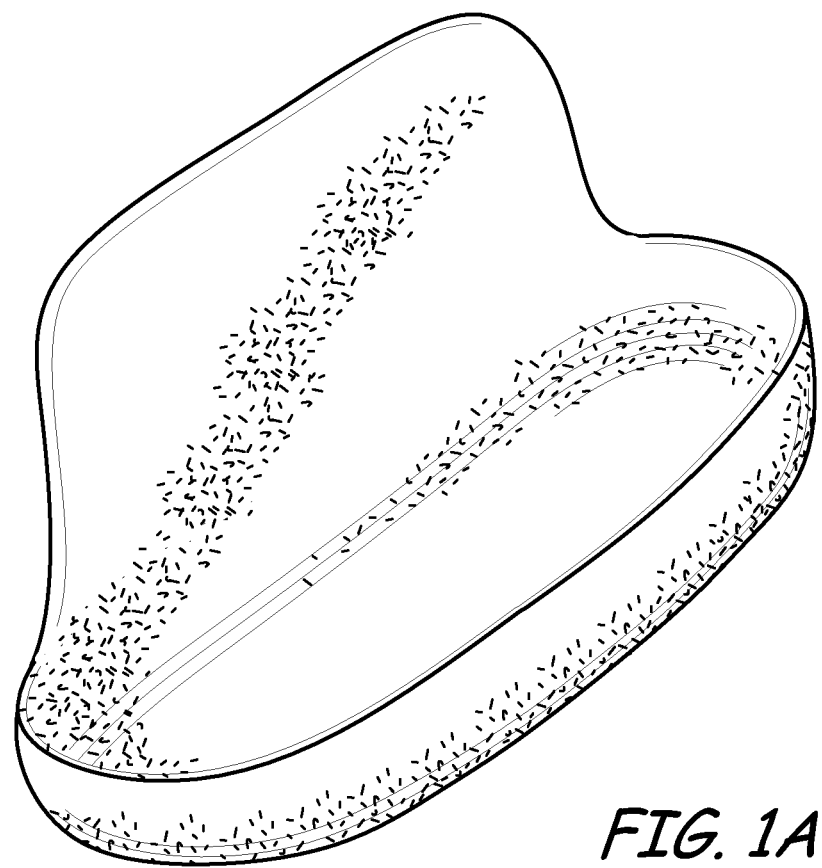
FIG. 1A depicts a model of a canoe/boat shaped soft tortilla with extended sides.

The present invention relates to improved shelf stable consumer packaged food articles including components fabricated from a Mexican tortilla like chemically leavened cooked farinaceous dough in a variety of thin walled three dimensional set or rigid shaped forms yet soft and flexible that are useful for edible containers of loose particulate food stuffing and to methods for their preparation.

Throughout the specification and claims, percentages are by weight and temperatures in degrees Centigrade unless otherwise indicated.

The present consumer packaged food articles comprise at least one soft shaped tortilla piece as its principal edible component. As used herein, a "soft shaped tortilla" or, equivalently, a "shaped soft tortilla" means a fully cooked but non-fried tortilla farinaceous dough product that is formed into a thin walled three dimensional shape of sufficient rigidity to holds its shape at room temperature. Thus, "tortilla" means a fully cooked product. By comparison, "tortilla dough" means uncooked or partly cooked product. "Fully cooked" is understood to be a product that reaches about 85° C. (+/−2 degrees), and is evidenced by substantially all of the starch being gelatinized.

Broadly, in one article aspect, the present invention comprises a soft shaped tortilla in a variety of specific three dimensional shapes or configurations. These shaped food articles are useful as the principal edible components of consumer packaged food product articles. Traditionally, in northern Mexico, tortillas are cooked unleavened flexible flat breads typically in thin or flat, circular or elliptical shape useful as an edible bread wrap for small quantities of other foods such as meat pieces, rice, and/or vegetables mixture. Thus, the present food articles are to be distinguished from egg or egg omelette based dishes often referred to as "tortillas" (Tortilla de patatas) in other Spanish speaking locations.

In one aspect, the present disclosure encompasses a soft shaped tortilla product with the shape being defined as being other than flat. (a) flat, (b) flat or in the shape of a cup or bowl, (c) flat or boat/canoe shaped, or (d) flat, in the shape of a cup or bowl, or boat/canoe shaped.

In another aspect, the disclosure encompasses a soft shaped tortilla that is formed into three dimensional shape suitable for holding fillings, wherein the shape is other than (a) flat or (b) flat or boat/canoe shaped.

The final moisture content of the soft shaped tortilla is less than about 28% (~≤28%), preferably ~≤25%. In preferred form, the soft shaped tortillas are shelf stable and exhibit a water activity value ("$A_w$") of ~≤0.88. In less preferred variations, the soft shaped tortilla pieces are suitable only for refrigerated distribution and sale and exhibit an $A_w$ of ~≤0.92.

The particular selection of ingredients and concentration are selected to provide finished soft shaped tortilla products having a water activity ("Aw") of 0.88 or less and for best results less than 0.85 to about 0.7. Selection of such water activity value is important in achieving a balance between microbial shelf stability and dough handling characteristics. Water activity can also be reduced by using polyols such as glycerol and sorbitol. Good results are obtained when the moisture content of the finished product ranges from about 10% to about 25%, preferably about 15% to 20%.

The invention disclosure further encompasses a method of making a soft shaped tortilla product.

In one particular aspect, the invention disclosure encompasses a tortilla (e.g., round, flour tortilla) that is hot formed to hold the shape of a cup or bowl, e.g., a salad bowl. In other aspects, the tortilla can be formed to rigidly hold the shape of taco (i.e., U-shaped taco shell) or the shape of a boat/canoe. In still other aspects, the tortilla can be formed to hold the shape of a pita, flower bud, pie, tube, envelope, pod, bun, or cone. The formed shape can have a flat bottom and sealed sides.

In accordance with the invention, the soft shaped tortilla articles can be provided in a variety of sizes from jumbo burrito size to mini chalupa size. A "chalupa" (Spanish for "boat" or "launch") is a tortilla dough formed into a shape reminiscent of a small boat. As starting material, it is possible to use round precooked tortillas or rounded flatted tortilla dough that is about 76 mm, about 102 mm, about 127 mm, about 152 mm, about 178 mm, about 191 mm, about 203 mm, about 229 mm, about 254 mm, or up to about 305 mm, or more, in diameter. For example, a 190 mm diameter precooked tortilla or flattened tortilla dough can be used to give a cup dimension of about 89 mm diameter and about 51 mm height. It is also possible to use precooked tortillas or flattened, pre-cut pieces of dough that are cut to easily fit into a mould for shaping. The starting material can be any shape suitable for the final mould, for example, round, oval, crescent, square, rectangular, trapezoid, triangular, etc.

In one aspect, the overall size of the soft shaped tortilla is such it is portable to hold, and that the consumer can take mouth sized bites. In this aspect, the width of the soft shaped tortilla is no wider than the distance an average adult mouth may comfortably open when consuming a sandwich. In another aspect, the width of the soft shaped tortilla is no wider than the distance an average child mouth may comfortably open when consuming a sandwich. In one particular aspect, the overall width after forming is about 25 mm or less, or about 12 to about 25 mm, for example, for children. In one other aspect, the width is about 37 mm or less, or about 12 to 37 mm, for example, for adults.

In another aspect, the height of the soft shaped tortilla is limited to the distance an average adult mouth can comfortably open when consuming a sandwich. In another embodiment, the height of the soft shaped tortilla is limited to the distance an average child's mouth can comfortably open when consuming a sandwich. In a specific aspect, the height of the soft shaped tortilla is about 25 mm or less, or about 12 to about 25 mm, for example, for children. In another aspect, the height is about 37 mm or less, or about 12 to about 37 mm, for example, for adults.

As a larger size, the soft shaped tortilla will have a width of at least about 25 mm. In another aspect, the width is limited to the bite width of an average adult mouth. In yet another aspect, the width is limited to the bite width of an average child's mouth. In a particular aspect, the width of the soft shaped tortilla is about 25 to about 51 mm, for example, for children. In one other aspect, the width is about 37 to about 75 mm, for example, for adults.

Depending on the final form of the tortilla, the overall diameter of the soft shaped tortilla (e.g., for the leading part which is directed into the mouth) can be any size from about 10 mm, about 12 mm, about 15 mm, about 20 mm, about 25 mm, about 30 mm, about 35 mm, about 37 mm, and about 40 mm, or for example, from about 12-37 mm.

Regardless of specific shape, a feature of the present soft shaped tortilla articles is a thin walled construction characteristic of a tortilla. Good results are obtained in terms of sufficient rigidity as to maintain the desired structure while nonetheless providing a soft eating quality characteristic of wheat tortillas, is obtained when the present articles are fabricated with wall thicknesses ranges from about 1-5 mm, preferably about 2-4 mm. For example, in one specific embodiment, the thickness of the soft shaped tortilla can be about 1.3 mm, about 2.3 mm, about 3.3 mm, or about 3.8 mm.

Good results are obtained when the present shaped tortilla articles are fabricated having a length ranging from about 50 mm to about 250 mm. In certain embodiments, the articles range from about 70 mm to about 200 mm in length. In certain specific embodiments, the articles have a length of, about 150 mm, while in certain other specific embodiments having a length of about 170 mm, about 190 mm, about 200 mm, about 250 mm, or more or in a range of from about 50-mm to about 200 mm.

In another variation, the shaped tortilla of the present invention can be made using a standard tortilla having a thickness less than 1.5 mm or a thickness greater than or equal to 1.5 mm. As mentioned above, range on thickness could be 0.5-5 mm Consequently, in one aspect, the shaped tortilla can be made from a standard tortilla having a thickness of about 1.5 to about 3.0 mm, or greater. In one aspect, then, the shaped tortilla can be made from a standard tortilla having a thickness of about 1 to about 2.0 mm, or greater.

In one particular aspect, the cavity of the shaped tortilla is larger than the cavity of the conventional tortilla. Consequently, the shaped tortilla can hold a greater amount of filling than the conventional tortilla. In this way, the shaped tortilla can be filled with greater amounts of meat and still have room for adequate amounts of all other available fillings. The cavity of the shaped tortilla can also provide consistent wrapping to filling ratio throughout the product. As such, the tortilla fillings can be enjoyed down to the last bite, as opposed to the last bite being a mouthful of dough. This provides for greater eating satisfaction and, as a result, will be preferred by a consumer. In addition, the larger cavity allows a utensil (e.g., spoon) to be used to access the cavity when used to load the filling.

Figure 2:
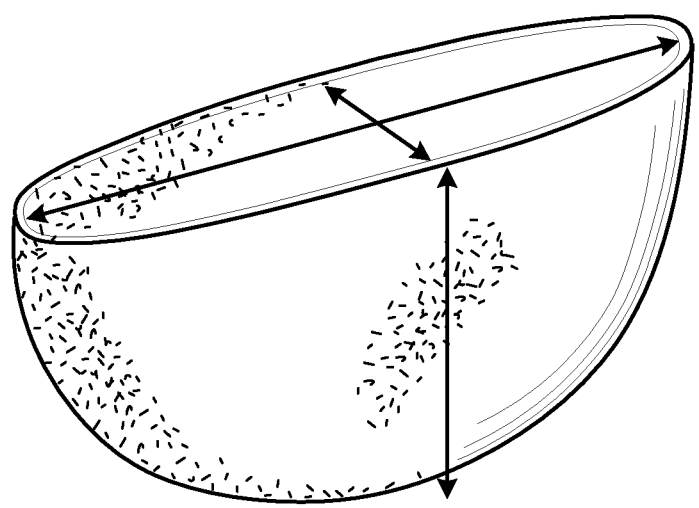
FIG. 2 depicts a model of a pita shaped soft tortilla.
Figure 3:
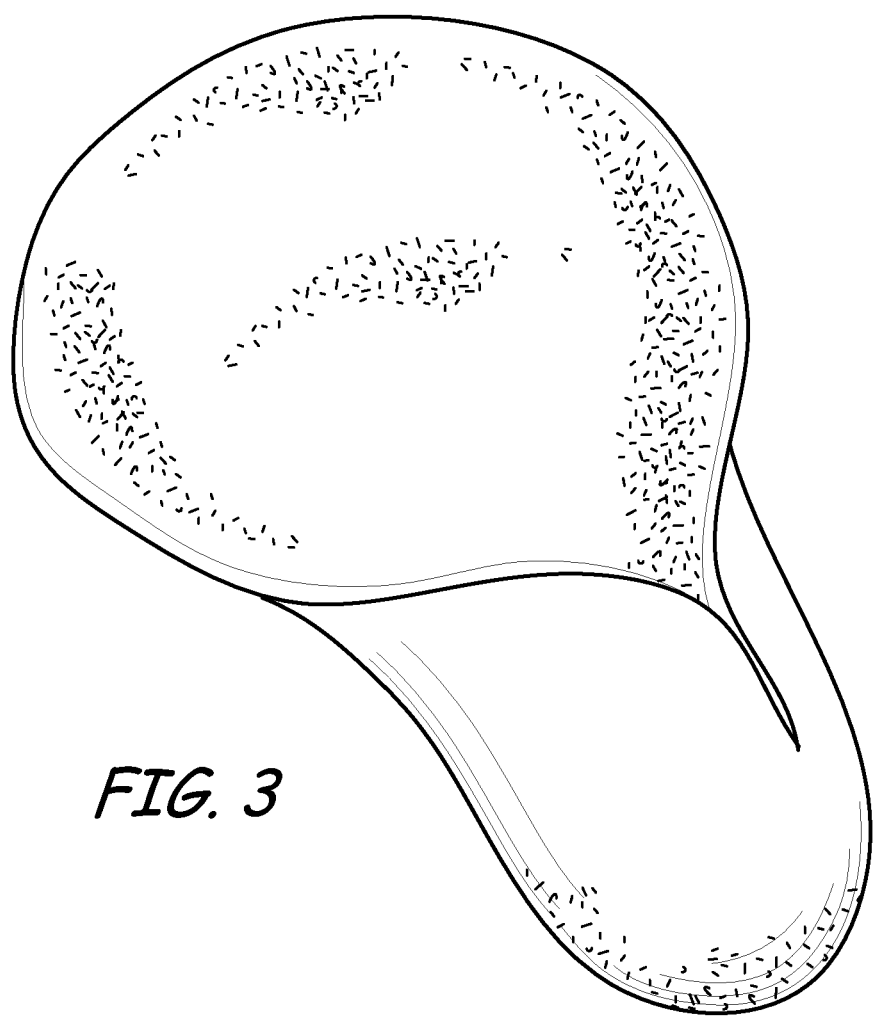
FIG. 3 depicts a model of a flower bud shaped soft tortilla.
Figure 4:
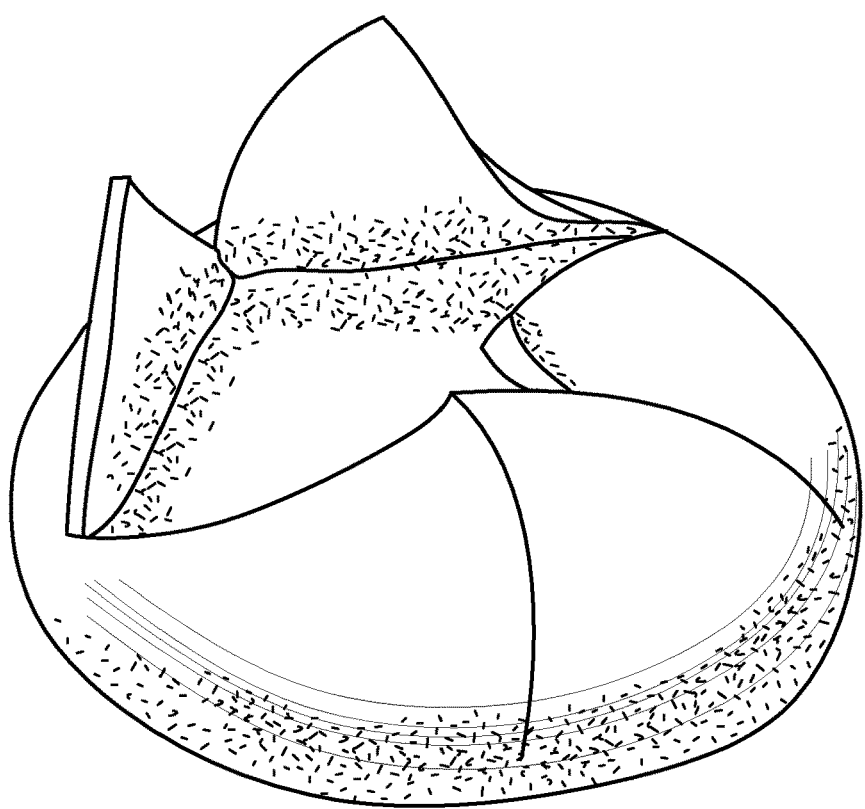
FIG. 4 depicts a model of a pie shaped soft tortilla.

Notably, each of the disclosed shapes provides benefits to the consumer. The boat/canoe shape (e.g., FIG. 1) is easy to fill, holds a large amount of fillings, and allows layering of fillings. The pita shape (e.g., FIG. 2) is easy to hold and use, fitting naturally into the hands. It is a familiar shape and provides consumers with an indication when maximum filling is reached. The flower bud shape (e.g., FIG. 3) is easy to fill and provides the option to fold or leave open. It allows one handed eating, which is easy for kids and suitable for consumers on the go. The round bottom allows filling down to the last bite. The pie shape (e.g., FIG. 4) is unique, impressive, and ideal for entertaining. It has a large opening which is easy to fill.

Figure 5:
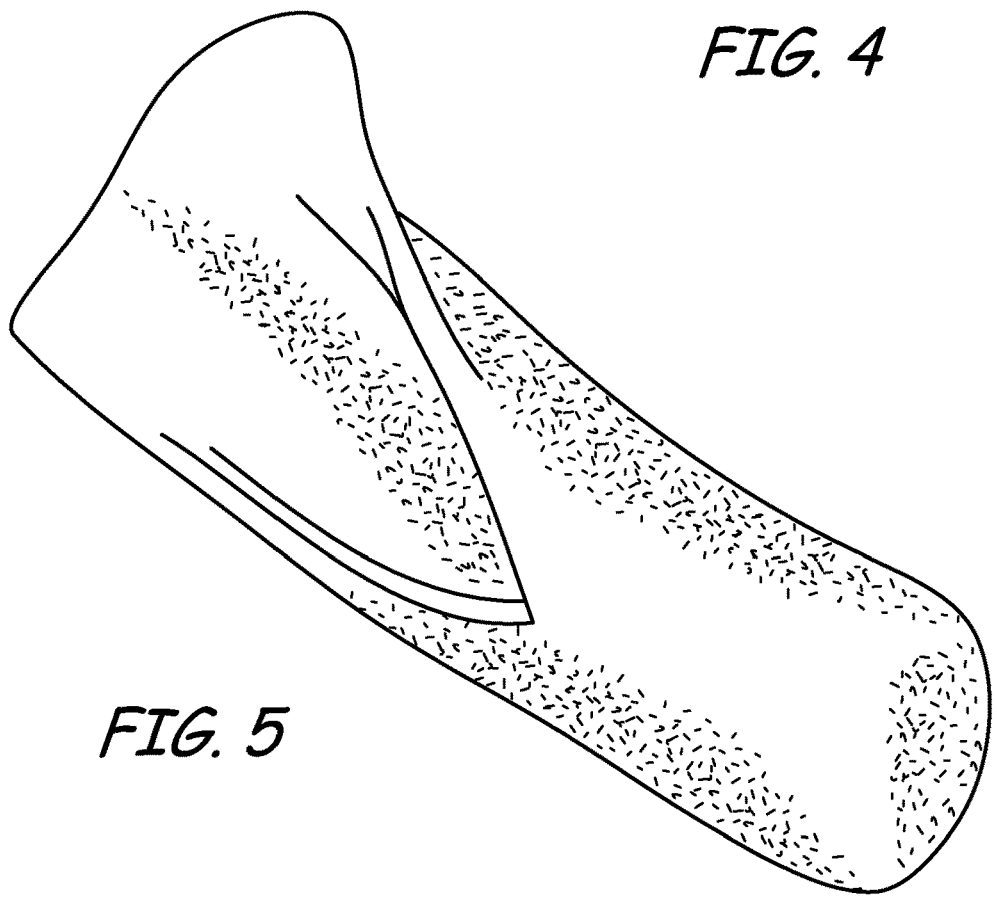
FIG. 5 depicts a model of a tube shaped soft tortilla.
Figure 6:
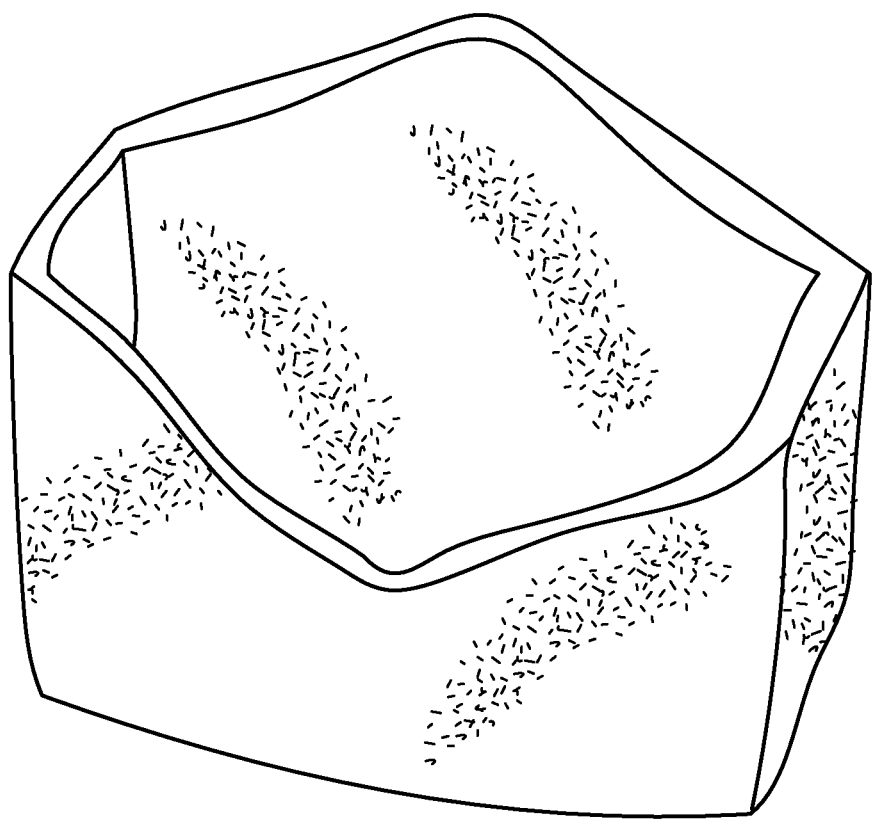
FIG. 6 depicts a model of an envelope shaped soft tortilla.
Figure 7:
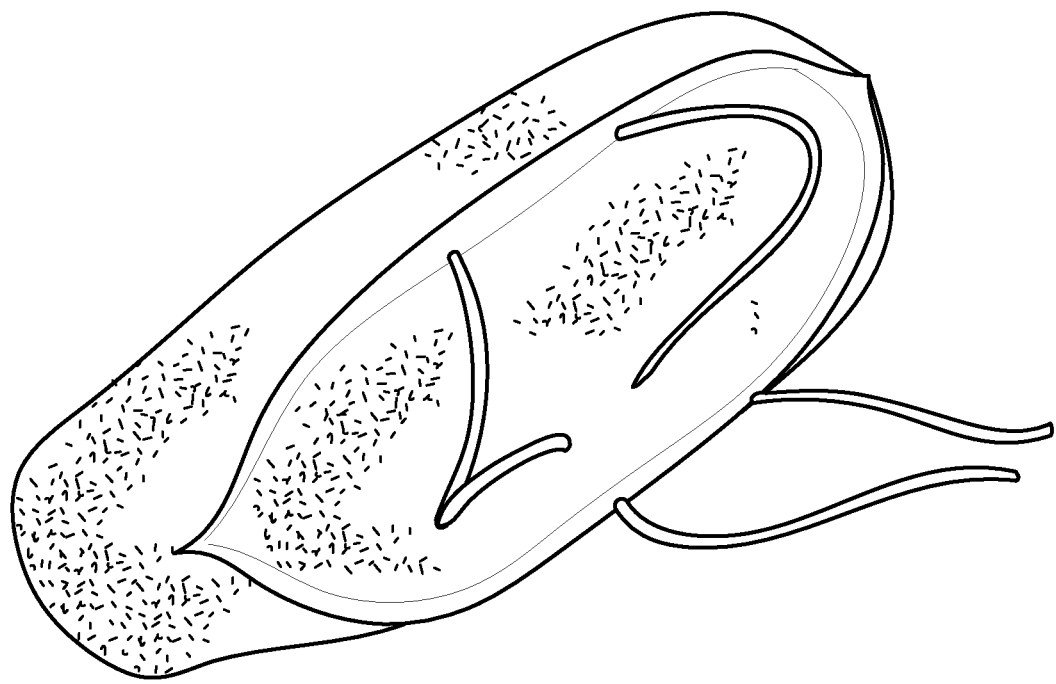
FIG. 7 depicts a model of a bun shaped soft tortilla with edible string.
Figure 8:
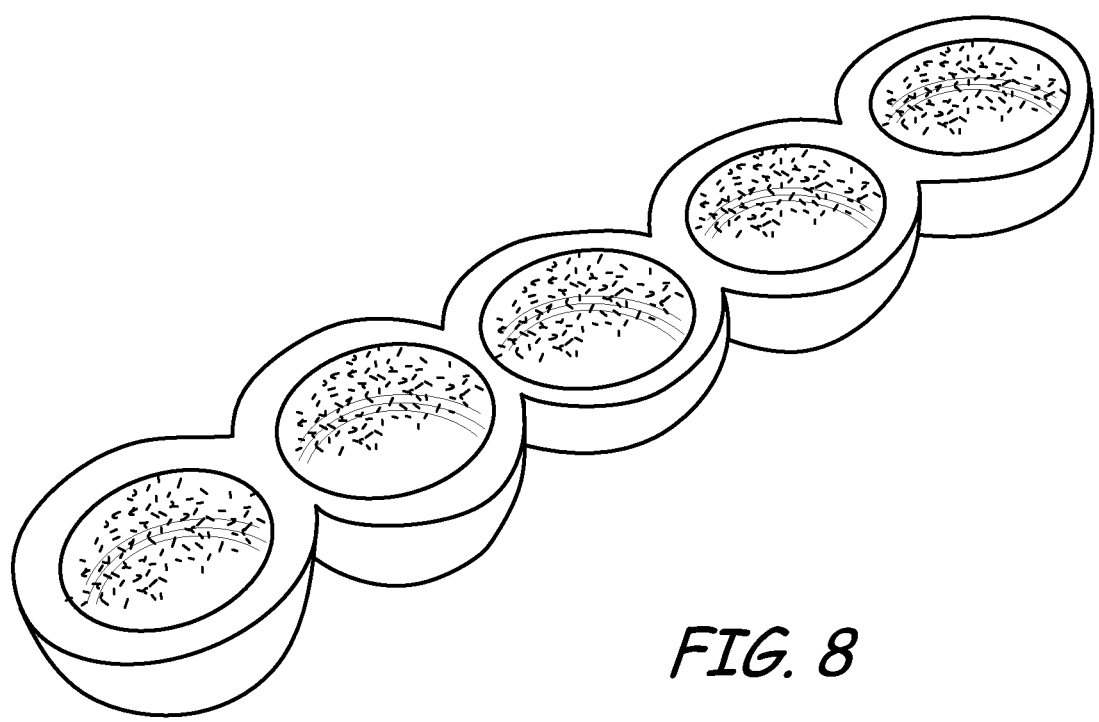
FIG. 8 depicts a model of pod shaped soft tortilla.
Figure 9:
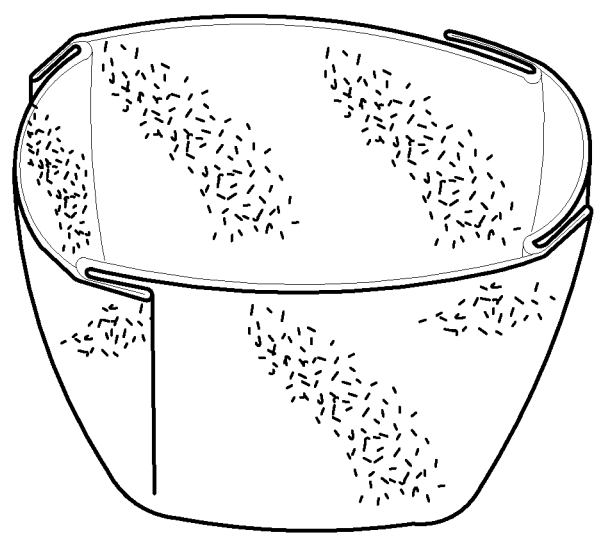
FIG. 9 depicts a bowl shaped soft tortilla.

As another option, the tube shape (e.g., FIG. 5) is easy to hold together, making it neater to eat. It has a wide bottom which allows for large amounts of filling. The envelope shape (e.g., FIG. 6) provides a flap to fold over. This looks tidy and prevents ingredients from falling out. It also sits flat on the plate making it easier to fill. The pod shape (e.g., FIG. 8) is unique, fun, and adaptable. The pods can be used separately, for example, for dips, or can be used as a set, for example, to fill with different ingredients. The boat shape (e.g., FIG. 7) is kid friendly and very adaptable, as it can also work as a dessert option. For example, it can be presented as a sweetened tortilla filled with fruit chocolate, cinnamon, etc. In another aspect, the shaped tortilla can be formed into that of a salad bowl (e.g., FIG. 8). Although not as portable as other shapes, it does offer an alternative for use in restaurant or food service venues, as a non-fried taco salad option.

In a preferred aspect, the precooked tortilla or tortilla dough is formed into a rounded shape, e.g., a cup or a bowl, or optionally, a taco shape (i.e., U-shaped taco shell), boat/canoe shape, pita shape, flower shape, pie shape, tube shape, bun shape, or cone shape. Yet, it is understood that the disclosed shapes are exemplary, and that any shape can be utilized in accordance with the invention. In addition, each of the described shapes can be modified as needed, for example, for the boat/canoe shape, one or more of the ends can be folded high, and for the pita shape, the product can include a flap that folds over.

It will be further understood that the shaped tortillas can be prepared from a variety of cereal flours, for example, with white flour, corn flour, masa flour, whole wheat flour, multigrain flour, whole grain flour, rice flour, gluten-free flour, or any combination thereof. The dough can additionally include added herbs, seasonings and flavour ingredients to provide general flavours such as Mexican, Italian, Mediterranean, Asian, Caribbean, and Indian; and specific flavours such as jalapeno, chipotle, cheese, black bean, red chilli, pesto, herb, garlic, rosemary, vegetable, spinach, sundried tomato, basil, cilantro, or any combination thereof; and dessert flavours such as chocolate, blueberry, pineapple, banana, honey, and apple cinnamon, or any combination thereof.

In one aspect, the shaped tortillas (e.g., bun shaped products) are used in conjunction with edible string. This can be used to provide fun for kids and increased portability for work lunches. In various aspects, one or more different flavours of string can be used with one tortilla.

In accordance with the invention, the shaped tortillas can be used as 'blank canvas' allowing consumers to create own taste preferences and also experiment as tortilla taste compliments all kinds of flavours and ingredients. The shaped tortillas allow a large number of options for fillings and folding. The texture and thickness of the shaped tortillas is ideal for a variety of meal choices. It is flexible enough to hold fillings and avoid breakage, and moist enough to please the palate.

In particular, the shaped tortillas can be used as a breakfast alternative (e.g., with cooked eggs, omelettes, ham, bacon, or VEGEMITE™ brand food paste (which is a dark brown food paste made from yeast extract, used mainly as a spread on sandwiches, toast and cracker biscuits, as well as a filling of pastries. VEGEMITE food paste is made from leftover brewers' yeast extract, a by-product of beer manufacturing, and various vegetable and spice additives), for lunch (cold fillings such as salad, ham, lunch meats, etc.), and for dinner (hot fillings such as meats, vegetables, etc.). It will be understood that Mexican fillings (e.g., taco, burrito fillings) are specifically envisioned, including lettuce, beans, peppers, cheese, cooked meat or poultry, sauce, sour cream, guacamole, etc.

The present invention features a number of advantages. It allows consumers to place many types of fillings (e.g., salad greens, taco fillings, etc.) inside, but is lighter and healthier than a fried shell or a bread bowl. It gives the advantage of being able to hold the fillings in the tortilla while reducing the problem of filling falling out the sides of a typical taco shell or tortilla. The ends of the formed tortilla can be sealed, so there is minimized leaking out of the end of the tortilla. The sides of the tortilla can rise from the base slightly so that fillings are less likely to leak out during filling. Optional side extensions can make the tortilla enclosed.

In this way, the invention provides the convenience of a pre-formed shell, in pliable, healthier, low mess presentation. The invention gives consumers the option of a soft, neater to eat tortilla. The shaped tortillas remain tender and malleable to give the true tortilla eating experience with minimal cracking. The shaped tortillas of the invention are clearly distinguished from shells which are deep fried and crispy. The invention is unique in that it provides for tortillas to retain a predetermined shape without the need for frying, while maintaining a soft texture. Also, the present products are to be distinguished from smaller bite-sized tortilla chips which are crisp and frangible whether made by deep fat frying or baking or other bite sized carriers, or holders.

As further advantages, the shaped tortillas can be made on a sheeting line with high throughput. The shapes can be stackable for compact packaging. The tortilla products can be provided in a shelf stable format with re-sealable packaging. The soft format of the formed tortillas avoids the breakage and wastage associated with hard shelled holders. The portability of the shaped tortillas gives consumers the freedom to eat at home, at work or on the go. It provides consumers with convenient eating solutions, including spontaneous and last minute meal options.

The invention also encompasses a method of making a soft tortilla which is formed into a shape. The method can comprise putting raw tortilla dough in a mould and cooking it to completion to set the shape. Alternatively, the method can comprise heating raw tortilla dough in a mould to set the tortilla shape without fully cooking it. The shaped dough is then heated in a further step to fully cook it, so as to cause the structure to become firm, and to lower the moisture level.

As another alternative, the method can comprise preheating flattened tortilla dough; further heating the flattened dough in a mould to set the shape; and further heating the moulded dough to fully cook it and to reduce the moisture content. In a further alternative, the method can comprise heating a flat precooked and preheated tortilla; wrapping the heated, flat precooked and preheated tortilla around a mould to form a shape; and allowing the warm, shaped soft tortilla product to cool in a manner that retains the shape and reduces the moisture content.

As a still further alternative, the method can comprise injecting raw dough or batter into a mould and cooking it to completion to set the shape. In an even further alternative, the method can comprise injecting raw dough or batter into a mould and heating it to set the shape without fully cooking it. The shaped dough is then heated in a further step to fully cook it, so as to cause the structure to become firm, and to lower the moisture level.

The method can further comprise causing the dough to create gas bubbles in an irregular manner so as to cause browned areas or points. The method can still further comprise using two heated cooking moulds, wherein the first mould comprises a cavity in the shape of the tortilla product; and the second mould comprises a protrusion shaped to fit into the cavity of the first mould. These are commonly called male and female moulds.

It should be noted that, while the present invention finds particular suitability for use in connection with the provision of white flour based recipes, the skilled artisan will appreciate that the present invention finds usefulness in provision of recipes encompassing corn flour, masa flour, rice flour, wheat flour, multigrain flour, whole grain flour, or any combination thereof, including wheat/white blends, multi-grain/white blends, masa/white blends. The shaped tortillas can be prepared as products that are reduced fat (,i.e., reduced or lower in fat compared or relative to fried tortilla shells) having a fat content of 20% or less, or low fat, reduced or low carbohydrate, or reduced or low sodium, or "lite", or any combination thereof. By "low fat" is meant herein a product having a fat content of 10% or less. In certain preferred embodiments, the present tortilla products have fat levels ranging from about 5-9% fat.

For corn tortillas, masa dough can be formed. This can be done by purchasing masa dough from a vendor, purchasing masa flour, and mixing it with water, annatto (an optional yellow colouring), salt, and rework to form the dough, or by purchasing raw corn and processing it to make the masa dough. If raw corn is purchased, the raw corn is cooked with lime and then steeped. The corn is then washed and ground into masa flour, which is then mixed with other ingredients to form the dough.

The dough (i.e., any type or flavour) can be processed through a sheeting machine to form flat raw tortilla dough. In one embodiment, the flat raw highly developed tortilla dough is placed onto moulds prior to heating. In another embodiment, the tortilla dough is pre-heated during flattening, before placement. In an alternate embodiment, the tortilla dough is cooked before placement onto the moulds. According to the invention, the moulds can be solid, or vented and/or perforated, or conventional forms having upper and lower plates.

The tortillas or tortilla dough (preheated or not) can then be heated to adopt the form of the moulds. For this heating, the tortillas or tortilla dough can optionally be baked, resulting in tortillas with toast marks. This also reduces moisture content. After heating, the moulded products exit as one or more shapes described herein. Since the formed tortillas are still pliable for short periods while still hot immediately after heating, care is taken to preserve the desired shape. The shapes become more rigid as the tortillas cool.

The shaped products are heated to reduce the moisture content. For this, any warm heat source can be used. Baking is preferred, including baking by conventional ovens, convection ovens, rotary rack ovens, brick ovens, infra-red ovens, tortilla ovens, and toaster ovens. Grilling can also be used. In certain aspects, the invention specifically excludes the use of microwave heating. Preferably, the shaped tortillas are heated to retain softness while avoiding a tough, chewy, or soggy texture. In various aspects, the moisture content of the final product can be in a range from about 23% to about 28%, or specifically, about 24%, about 25%, or about 26%. In particular aspects, the water activity of the final product can be in a range of about 0.82 to about 0.92, or less than 0.88.

In the preferred embodiment, the shaped soft tortilla piece is fabricated from a dough formulation from a chemically leavened wheat based or farinaceous baked developed or gluten structured dough. Batters and doughs as used herein are distinguishable compositions even though each comprises some number of common ingredients. "Dough" as used herein refers to an intermediate food product that has a gluten-based structure. In dough, the gluten forms a continuous dough elastic medium into which other ingredients are embedded. A dough is typically prepared by mixing and kneading or "working" and is often stiff enough to cut into various shapes.

In contrast, "batter" as used herein refers to an intermediate food product that comprises flour, water, eggs and salt and optionally fat and sugars that are a starch batter-based composition. In a batter, gluten development is purposefully minimized. Batters are inelastic. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of container. Thicker batters in the form of a paste have certain properties of thickness similar to doughs but nonetheless are quite different therefrom.

"Dough" as used herein further refers to an intermediate food product that has a low water concentration. Prior to piece forming and case hardening, the dough, has a water activity within a range of about 0.95 to 0.99 and a moisture content ranging from about 30-40%

In the present invention, in the preferred embodiment, at least a major portion (greater than about 51%) of the flour used to prepare the dough is a wheat flour. The flour ingredients can further include a minor portion (less than about 49%) of additional flour types. For example, in certain variations, the minor portion can includes corn flour, corn masa, masa harina and mixtures thereof. Good results are obtained when a medium protein of "all-purpose" wheat flour (having a gluten based protein content ranging from about 9-12% is used to supply wheat flour. Bread flour (having a higher gluten protein content ranging from about 12% to 16%) can also be used. Lower protein content cake flours (having a protein content of less than 6%) are less preferred although blends of cake or pastry flours and bread flour (to achieve an averaged wheat flour protein content ranging from about 6-9%) can be used. In a preferred embodiment, a flour is employed having about 11.5% protein.

The doughs can also comprise added ingredients to increase dough stability, to improve eating quality, and to prolong palatability.

Unlike traditional fresh tortilla dough formulations, the present dough formulation of the present invention, in highly preferred embodiments, comprise from about 1% to about 15% of an edible fat or shortening ingredient, preferably about 4-10% and for best results about 9%. A shortening component adds richness to the eating properties of the finished baked goods as well as aids in the leavening process. Most importantly, the shortening component provides additional flexibility or pliability to the tortilla product over its extended shelf life.

Preferred for use herein are shortening ingredients that are solid at room temperature to provide physical stability. Useful herein to provide such room temperature solid fats are hydrogenated fats such as obtained from common vegetable oils such as soy, corn, canola, safflower, cottonseed, and the like. However, since hydrogenated fats can be sources of undesirable trans fatty acids, current health trends disfavour usage of hydrogenated fats. Thus, preferred for use herein are those naturally occurring fats that are solid at room temperature without hydrogenation. Among these, preferred for use herein are palm, coconut, palm kernel oil, and fractions and mixtures thereof. Of course, mixtures of naturally solid fats and fats obtained by hydrogenation are contemplated.

The present invention can further comprise about 2% to about 15% of a humectant on a dry weight basis, preferably about 4% to about 8%. Humectant addition is helpful in achieving the present water activity levels and the microbial shelf stability at room temperature provided by the present food products. The humectant can be any commonly employed humectants ingredient. Preferred humectants for use herein are selected from the group consisting of glycerin, glycerol, mannitol, propylene glycol, sorbitol, xylitol and mixtures thereof. Preferred for use herein is glycerin by itself or a mixture of sorbitol and glycerin.

The dough can additionally include about 0.1% to about 4% salt, preferably about 0.5% to 3% salt.

Unlike traditional fresh tortilla dough formulations, the dough of the invention can and in preferred embodiments do, also comprise a chemical leavening system or baking powder to provide a chemically leavened wheat dough. The chemical leavening or baking powder useful herein are such as those containing sodium bicarbonate and the combination of one or more baking acids with sodium bicarbonate. Baking acids useful for chemical leavening and dough mixtures include monocalcium phosphate, glucano-deltalactone, potassium hydrogen tartrate, dimagnesium phosphate, and mixtures thereof. One or more baking acids can be combined with the sodium bicarbonate to form the chemical leavening agent.

Baking acids useful for chemical leavening and dough mixtures include monocalcium phosphate monohydrate, sodium aluminum sulfate, sodium aluminum phosphate, dicalcium phosphate, glucano-deltalactone, potassium hydrogen tartrate, dimagnesium phosphate, and mixtures thereof. One or more baking acids can be combined with the sodium bicarbonate to form the chemical leavening agent.

One preferred leavening system which provides this combination of fast and slow acting leaveners is baking powder that combines baking soda or sodium bicarbonate with any of sodium aluminum sulfate, sodium aluminum pyrophosphate, monocalcium phosphate and mixtures thereof. In another preferred embodiment, medium acting leaveners such as SAPP 28 (sodium acid pyrophosphate) can be used. (SAPPs can react in a range of rates with SAPP 28 being about in the middle). It is believed that the fast acting leavening agent provides improved texture or rheology when the dough is heat set, and the slow acting leavening agent provides desired textural attributes when the dough is finish cooked such as by baking.

The formulations for the dough from which the present shaped tortilla pieces are fabricated additionally can include one or more emulsifiers. Specifically, the present formulations can further comprise about 0.2% to about 1.5% of a emulsifier on a dry weight basis, preferably about 0.4% to about 0.8%. Emulsifiers, which strengthen the dough, give improved mixing and handling tolerance, increase loaf volume, improve mechanical slicing characteristics, and can retard staling. Emulsifiers typically are surface active agents that stabilize mixtures of hydro-phobic and hydrophilic substances by lowering the interfacial tension between usually immiscible substances. Emulsifying agents which can be used include mono- and diglycerides of fatty acids, propylene glycol mono-diesters of fatty acids, glycerol-lactose esters of fatty acids, ethoxlated or succinylated mono- and diglycerides, lecithin, diacetyl tartaric acid esters or mono-diglycerides, sucrose esters of glycerol, or equivalents thereof and mixtures thereof. Preferred emulsifiers include mixtures of diacetyl tartaric acid esters, and succinylated mono- and diglycerides. Emulsifying agents can be used singly or in combination with typical usage levels of less than 3% by weight.

The formulations for the dough from which the present shaped tortilla pieces are fabricated additionally can include one or more dough conditioners. The present formulations can further comprise about 0.2% to about 1.5% of a dough conditioners on a dry weight basis, preferably about 0.4% to about 0.8%. The dough conditioners used herein can be of the oxidizing type, reducing type or both. Oxidizing agents or oxidizing type dough conditioners strengthen the dough. Thus employment of oxidizing dough conditions can lead to economies with shortened makeup times or by compensating for low protein in the flour. More commonly used oxidizers today include azodicarbonamide (ADA), which can be used at up to 45 ppm in the United States, and L-ascorbic acid (LAA), or vitamin C, for which there is no usage limit in the United States. ADA works very quickly, and can easily be overused, producing dry dough that is hard to work, low volume and cracked bread surfaces. LAA works slowly; moderate overuse has no deleterious effect on quality and it is commonly used at about 75 ppm. LAA is currently the only oxidizing agent permitted in the European baking industry.

Useful dough conditioners can also include reducing agents, which serve to encourage the development of gluten, thus shortening the mixing time and decreasing the amount of mixing energy that is needed. The most commonly used reducing agent, L-cysteine. Also useful is sodium metabisulfite.

The chemically leavened dough of the present invention optionally includes a variety of ingredients suitable for rendering finished baked goods prepared therefrom more organoleptically desirable. These optional components include an anti-mycotic agent, anti-oxidants or preservatives, and flavor/coloring agents.

Especially preferred for use herein are flavour and color additives intended to mimic the yellow color of traditional yellow corn. While in certain jurisdictions, certain synthetic yellow colorants are permitted, especially useful herein for such color additives are those natural yellow colorants such as turmeric, beta carotene, and/or annatto and mixtures thereof. Also, while any edible vegetable oil can be used, preferred for flavor and color is corn oil.

Useful anti-mycotic agents include sorbic acid and its derivatives such as sodium or potassium sorbate, propionic acid and its derivatives, sodium diacetate, monocalcium phosphate, lactic acid, citric acid parabens and so on. These agents are present in an amount to aid in the inhibition of growth of undesirable yeast and/or molds, typically about 0.01 to 1.0% of dry weight basis ingredient such as sodium propionate, potassium sorbate, calcium propionate, sorbic acid and mixtures thereof. The anti-mycotic ingredient can be present in a range of about 0.01% to about 1.0% on a dry weight basis of the dry mix composition.

Where legally permitted, the products herein can additionally include common levels and types of anti-oxidants and preservatives such as vitamin E, BHA (butylated hydroxyanisole), BHT (butylated hydroxytoluene), TBHQ (tert-butyl hydroquinone), and mixtures thereof, up to levels permitted by current food laws.

The tortilla dough is preferably not acidified and thus ranges in pH from about 6.0 to 8.0.

The present invention provides methods for preparing a finished package soft shaped tortilla food article. The present methods can include steps of providing quantities of a chemically leavened gluten plastic dough; forming into shaped heat set pieces; baking; and packaging a number of pieces within a modified atmosphere package.

The chemically leavened doughs of the present invention are prepared by blending the essential and optional components such as wheat flour, optionally corn flour or corn masa, salt, sugar, shortening or oil, water;

glycerol or other polyol; and leavening system together in such a conventional manner as to produce a well blended developed gluten dough. Conveniently, the chemically leavened dough can be prepared from a first liquid premix blend and a second dry premix blend. The liquid premix blend can include the oil or liquid shortening, eggs, glycerol, emulsifiers and so on. The dry blend can include flour(s), sugar(s), salt; leavening and so on. The dry blend and liquid blend are then combined to form a gluten based plastic or viscoelastic dough. The chemically leavened dough is, for example, prepared in a batch or a continuous mixing device. The moisture content of the dough can range from about 20% to about 40% resulting in an $A_w$ ranging from about 0.95 to about 0.99.

In a preferred variation, the dough is a highly developed dough as expressed in Brabender units. Characterization of the doughs in Brabender unit ("BU's") is well known in the dough art and these units measure the doughs resistance to turning on a mixer hook. More highly developed or worked doughs exhibit greater resistance to turning. Good results are obtained herein when the present doughs have a Brabender value ranging from about 500 to 1000 BU. In more preferred variations, the dough is developed to its peak or, otherwise expressed, to maximum gluten strength development.

The dough is provided in small measured quantities useful herein for making the present sized and shaped pieces. In a preferred embodiment in the preparation of smaller base pieces, these quantities range from about 5-25 g each. For larger soft shaped tortilla base pieces, a larger quantity (e.g., 40-60 g) can be used. Any technique or apparatus can be used to provide such measured quantities of dough. For example, the dough can be formed into a continuous shape such as a rope, sheet or ribbon and the continuous strand sectioned (such as by a reciprocating guillotine knife) into desired uniform (±10%) quantities, e.g., if a 10 g quantity is desired, then each quantity will be 10 g±1 g. In small scale commercial production, simple manual cutting the dough into such small quantities is the preferred technique.

In preferred embodiments, the preparation methods additionally comprise a step dough of resting the measured quantity of dough to provide a measured quantity of rested dough. Good results are obtained when the measured quantities of dough, e.g., dough balls, are allowed to rest for 5-10 minutes at ambient temperatures. A resting step is useful for better facility of the dough conforming to the shape of the dough without thickness variations or weak spots in the finished pieces.

The present methods can further include the step of forming the individual quantities of chemically leavened dough, preferably rested, into shaped, leavened heat set soft shaped tortilla pieces. In one variation, this step is practiced as a single step cooking and forming operation employing a suitably shaped and configured heated shape press molds. The tortilla press mold is heated to provide a mold surface temperature ranging from about 190° C. to 205° C. (375° F. to about 400° F.). A quantity (e.g., 40-60 g) of the rested dough is placed within the shape press mold and closed and heated to initiate leavening and to heat set the soft shaped tortilla base piece. Good results are obtained when the heating step is practiced for about 45-60 seconds, preferably about 45-55 seconds. The heating operation heats the dough to temperatures sufficient to gelatinize and hydrate the starch components substantially completely and to denature the protein of its gluten content (85-95° C.; 185-200° F.). The formed heating step results in some moisture loss that adds to the leavening effect and results in hot cooked shaped pieces having a moisture content ranging from about 28% or less. The now cooked and set shaped soft tortilla piece is then allowed to cool in the mold through its glass transition temperature ("$T_g$") to room temperature to provide a tortilla piece in a sized and shaped set form piece that is no longer entirely plastic but semi-rigid, i.e., sufficiently rigid (although still pliable) to hold or maintain its shape.

However, in more preferred variations, the cooking step is practiced in sub-steps wherein only a par-bake operation is practiced at shorter times, e.g., in the heated press mold and the cooking step is completed in a subsequent finish baking sub-step. By reducing the time required in the press mold, greater through-puts can be obtained for greater cost efficiency. In this preferred variation, the initial heating or forming sub-step results in a par-baked or intermediated food item that is no longer a plastic dough.

During the forming sub-step, the fast and medium acting acids of the leavening system initiates the leavening process such that about 90% or more of the leavening occurs during this step. While the center plain portion is confined to a thickness of 1-2 mm by the tortilla press to provide a density in the center plain portion ranging from about 0.7-0.9 g/cc, Further expansion in the oven during the baking step allows the piece to chemical leavening to expand to a density of about 0.3-0.5 g/cc and a thickness of about 1-5 mm.

The present method can further include a step finish cooking the set par cooked base piece to form a finished soft shaped tortilla base piece food product. In preferred form, the finish cooking is a baking step that reduces the moisture content of the par cooked set piece from an initial value of about 26%-30% moisture to a finish moisture content ranging from about 25% or less and an $A_w$ of 0.88 or less. (There is actually only a small reduction in moisture in the press, the moisture went from 37 to 33% moisture. Most of the moisture loss is in the oven.) Conveniently, the par cooked base piece items are baked at about 175° C. to 210° C. for about 1-5 minutes, preferably about 2-4 minutes. Preferred for use herein is a belt oven using a combination of radiant, and conduction heating to provide a finished product having not only the desired finished moisture content but also the desirable toast points described above. In commercial form, a moving belt conveys the par cooked pieces into an elongated oven of sufficient length and at a line speed sufficient to provide a residence time within the oven to provide the desired baking or finish cook times herein. In other variations, a combination of one or more baking and heating steps can be practiced to provide not only the finish cooking of any raw portions of the piece but also to provide any desired toast points feature herein. The preferred method for us is to use a tortilla baking oven that is a series of plates or belts where the soft shaped tortilla are heated by conduction and radiant heat. An impingement oven using high velocity hot air would also work but the belt oven is preferred.

The finished base pieces so prepared are generally entirely cooked and any raw dough such as in the peripheral ring portion is finish cooked to at least 90% starch gelatinized.

After cooling to about room temperature, a number of finished soft shaped tortilla base pieces are packaged in a suitable food package. In one embodiment, the number of soft shaped tortilla pieces are formed or aggregated into one or more stacks or other ordered arrangement or arranged array such as the two side-by-side short stacks (not shown). In certain variations, preparation of the arranged array or protection of the arranged array is facilitated by a tray, support board or other secondary package element such as the U-board described above. In these variations, the packaging step can include a sub-step of mounting a number of finished soft shaped tortilla base pieces such as in a confronting relationship on a support member or carrier prior to disposing the numbers of finished pieces within the food package.

In another less preferred embodiment, the number of finished base pieces are in the form of a loose random mixture in the food package. While easier to add to a food package in a random form, such arrangements are less visually appealing. Also, such arrangements can provide less protection to the finished soft shaped tortilla base pieces against breakage during handling.

Suitable for use herein is a food package capable of hermetic sealing against moisture and optionally oxygen transport over extended shelf lies ranging from about 6-18 months are room temperature storage. In preferred form, the food package is fabricated at least in part from a flexible packaging film to form a bag or pouch. In certain variations, one or more stacks each individually wrapped in a sealed flexible packaging film with a modified packaging atmosphere are bundled together and provided with an overwrap also conveniently fabricated from a flexible packaging film.

The packaging step can also, and in the preferred embodiment, does include providing the food package with a modified packaging atmosphere. More particularly, the sub-step can include flushing the food package immediately prior to finish sealing with a low oxygen level (below 4% $O_2$, preferably below 1% $O_2$) packaging gas such as $CO_2$, $N_2$, $N_2O$ and/or other inert gas. The food package is then sealed to provide finished packaged food articles of the present invention. Preferably, the finished food packaged is hermetically sealed such as to provide a low oxygen packaging headspace environment of less than 4% $O_2$, preferably ≤1%, and for best results less than 0.5% during an entire six month of room temperature storage.

For some embodiments, the headspace comprises at least 10% (v/v) of $CO_2$, and can be at least 20%. In a preferred embodiment, the headspace comprises a blend of 40% $CO_2$ and 60% $N_2$. At such levels, the $CO_2$ provides modest preservative properties against spoilage.

In the preferred embodiment, the food package can be provided or made from a moisture loss resistant low oxygen permeability flexible packaging film to provide a hermetically sealed food package. In preferred form, the packaging material has an oxygen permeability value of less than 2.5 $cc/cm^2/day$. In other embodiments, the packaging can be in the form of a tin, plastic tub or cup or a paperboard canister provided that the container can maintain a low oxygen packaging atmosphere for the extended shelf lives contemplated herein. Thereafter, the present inventions in its method of preparation aspect can further include a step of inserting the finished packaged food articles into a carton. The shelf stable multi-texture wheat based soft shaped tortilla base pieces can be combined with wet or dry sauce pouches to provide meal kits for the at home preparation of Mexican soft shaped tortilla finished food products of superior taste and texture.

In a preferred variation, the packaging film is clear or has at least portion that are transparent so that the product can be view within the food package. In another variation, at least a portion of the packaging film is provided by a low oxygen permeability flexible laminate packaging film having a foil layer.

While the package can be overpressurized, preferred herein is an unpressurizable container for containing and storing the soft shaped tortilla since overpressurized containers are more expensive and unnecessary herein.

Also, pouches of wet and/or dry secondary food components can be prepared and inserted into the carton to form dinner kits. The kits can also include cans or tins of other ingredients, e.g., diced olives, pimentos, or peppers, or refried beans. The filled cartons are then finished sealed to provide the finished kit items of the present invention. The kit can include preparation instructions such as by a preparation instruction legend printed onto the carton exterior.

The present kits can be used to provide a multi-component finished soft shaped tortilla food article. The consumer can add various supplemental food ingredients such as cooked meat, fresh vegetables (onions, peppers, tomatoes), shredded cheeses, sour cream, chives, guacamole, refried beans and the like. If desired, the consumer can reheat the finished soft shaped tortilla base pieces prior to preparation of fished soft shaped tortilla meal items herein. In other variations, assembled soft shaped tortilla items can be warmed prior to consumption.

Figure 10:
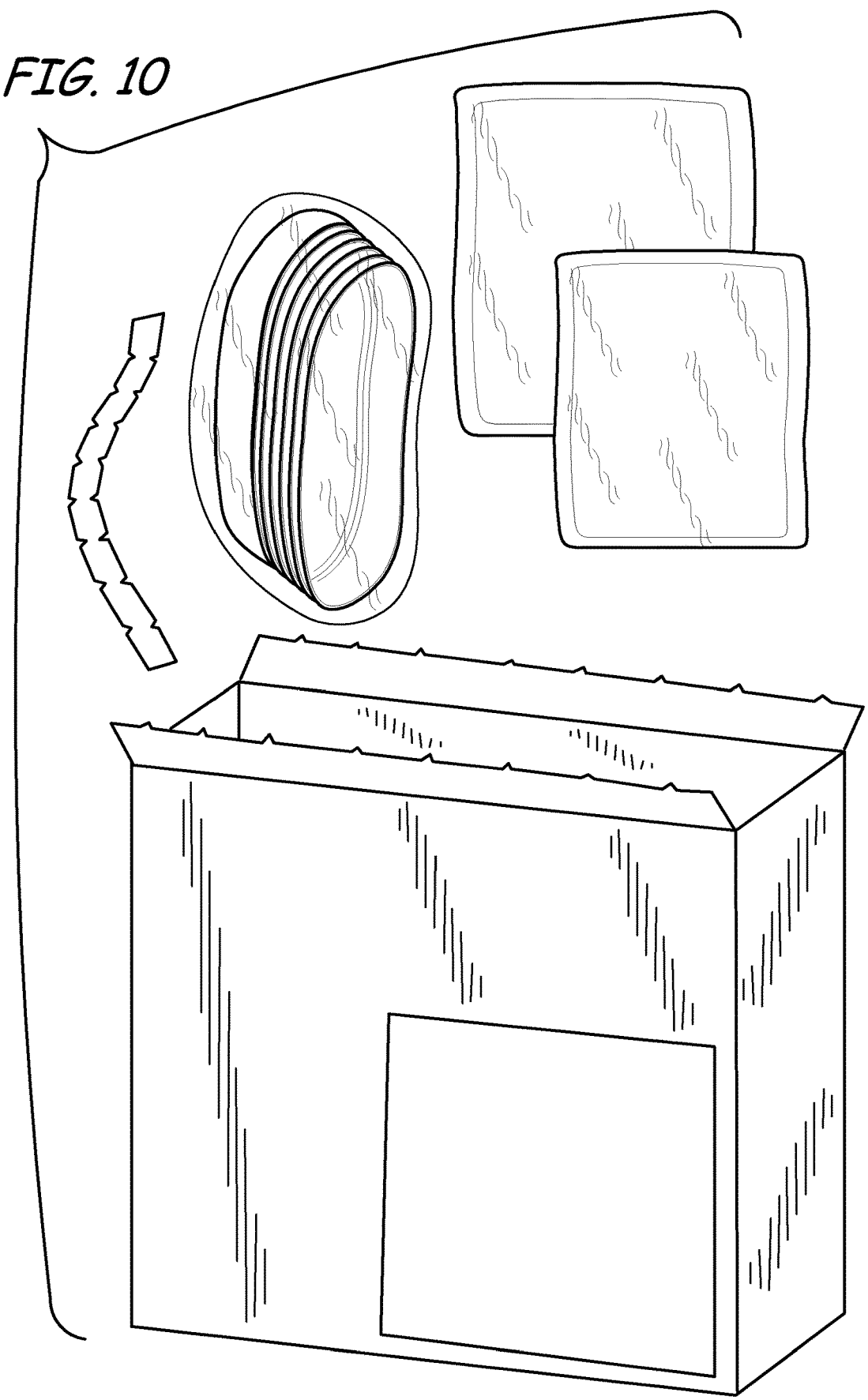
FIG. 10 is an exploded perspective view of a meal kit of the present invention including a carton housing a nested array of shaped tortillas food packaged article of the present invention as well as a dry pouch and a wet pouch of secondary food ingredients.

More specifically, FIG. 10 depicts a meal or dinner kit of the present invention. FIG. 10 depicts that the meal kit can include a carton or other container. The kit includes at least one packaged soft shaped tortilla base pieces article or the like as described above disposed within a container. The container can be a conventional paperboard carton optionally having an easy open feature such as tear strip. The kit also includes at least one sealed container of secondary ingredients. The container of secondary ingredients can be, for example, either a wet and/or a dry pouch. The kit can further include one or more preparation instruction legends. Legend(s) can include reheating suggestions, recipes for making toppings, or instructions on how to prepare a seasoned meat toping ingredient. Such legends can be on the carton as depicted and/or on the individual pouches (not shown). The kit container does not need to have a modified atmosphere. In certain variations, the kit can additionally include a clear film overwrap (not shown) to provide extra packaging protection. In still other variations, the kit can include a sealed container such as can or cup for including additional ingredients, e.g., refried beans in addition or in substitution for the wet or dry pouches. In still other variations, the kit can include a tray or other supplemental packaging support element (not shown) to prevent component movement within the carton.

For example, the pouch can contain a wet sauce such as a salsa sauce or cheese sauce. Wet sauce pouches are typically aseptically packaged for extended shelf lives. In another variation, the pouch can include a dry mix of seasoning ingredients to add to meat to form a flavored meat topping such as a taco seasoning blend. In this variation, dry blends of solid seasonings, salt, colors, seasoning, can be blended with pre-gelatinized starch. The dry seasonings can be mixed by the consumer with water, heated to form a flavored thickened liquid or thin paste and blended with consumer supplied cooked meat to form the flavored or seasoned meat topping ingredient or component. While a variety of seasoning mixes can be prepared, since cumin is a component of many Mexican dishes, the dry mix preferably includes at least cumin and salt. In still other variations, the pouch can include a cream ingredient such as a ready-to-spread topping frosting for those executions wherein the soft shaped tortilla is used as a dessert foundation. In certain variations, the kit can contain one or more pouches of dry and/or wet secondary kit ingredients such as pouches.

In still another embodiment, a previously formed tortilla (e.g., a conventional store-bought tortilla) is used to form a bowl after shaping and further heating to form a shaped product that is then heated until it retains its shape after cooling.

Preferably, the shaped tortillas are prepared so as to minimize the formation of discontinuities (e.g., bubbles and voids) during commercial production. Discontinuities in tortillas can be minimized by providing flour of the proper granulation, using the proper ratios of ingredients, maintaining the proper moisture level in the dough, heating and baking properly, and avoiding the use of moulds having unnecessarily complex geometries.

In one particular aspect, the shaped tortilla is reheated prior to being filled with heated filling. In another aspect, a heatable filling is placed in the shaped tortilla and then heated together. In yet another aspect, an individual or machine fills one or more shaped tortillas with heatable filling and then leaves the one or more tortillas for another individual to or machine to fill with other types of filling. Finally, in still another aspect, an individual or machine leaves one or more shaped tortillas for another individual or machine to fill with filling.

EXAMPLES

The examples described herein are for purposes of illustrating embodiments of the invention. Other embodiments, methods, and types of analyses are within the scope of persons of ordinary skill in the molecular diagnostic arts and need not be described in detail hereon. Other embodiments within the scope of the art are considered to be part of this invention.

Example 1

Wheat Tortilla Formula

| Ingredient | Formula % ranges | Typical usage levels |
|---|---|---|
| Wheat flour; 11-13% protein | 45-60% | 45%, 50%, 55%, 60% |
| Water | 15-30% | 15%, 20%, 25%, 30% |
| Hydrogenated Vegetable fat such as canola, cottonseed, corn, soy, safflower; naturally solid fats such as palm, coconut, | 5-10% | 5%, 7.5%, 10% |
| Glycerine | 0-10% | 0%, 2%, 4%, 6%, 8%, 10% |
| Salt | 1-2% | 1%, 1.5%, 2% |
| Leaveners; Baking powder, baking soda, leavening acids such as MCP, SAPP, SALP | 0.5-1% | 0.5%, 0.6%, 0.7%, 0.8%, 0.9%, 1% |
| Dough conditioners; Mono-glycerides, Di-glycerides, SSL, L-cysteine, DATEM | 0.25-1% | 0.25%, 0.5%, 0.75%, 1% |

Example 2

Standard Tortilla Procedure

1.) Combine ingredients in mixer
2.) Mix 4-10 minutes on medium speed until dough is fully developed
3.) Allow dough to rest five minutes
4.) Divide dough into 40 gram balls
5.) Press dough balls in tortilla press @ 400° F. (~205° C.) for 1-3 seconds
6.) Bake in tortilla oven @400° F. (~205° C.) for 30-90 seconds
7.) Cool five minutes on cooling rack
8.) Package tortillas
9.) Final tortilla moisture content of 23-28%, Water Activity at <0.880

Example 3

Soft Shaped Tortilla Procedure 1

1.) Ingredients were combined in mixer
2.) These were mixed 4-10 minutes on medium speed
3.) The dough was allowed to rest five minutes
4.) The dough was divided into 40-60 gram balls
5.) The dough balls were pressed in press comprising a preheated male and female mould with desired shape @400° F. (~205° C.) for 1-3 seconds
6.) The shapes were removed from the moulds and baked in a tortilla oven @400° F. (~205° C.) for 30-90 seconds
7.) The shapes were cooled five minutes on cooling rack
8.) The soft shaped tortillas were packaged
9.) Final tortilla moisture content was measured at 23-28%, Water Activity at <0.880

Example 4

Soft Shaped Tortilla Procedure 2

1.) Ingredients were combined in mixer
2.) These were mixed 4-10 minutes on medium speed
3.) The dough was allowed to rest five minutes
4.) The dough was divided into 60 gram balls
5.) The dough balls were pressed in press comprising preheated male and female moulds with desired shape @400° F. (~205° C.) for 15-90 seconds
6.) The shapes were removed from the moulds and cooled 5 minutes on cooling rack
7.) The soft shaped tortillas were packaged
8.) Final tortilla moisture content was measured at 23-28%, Water Activity at <0.880

Example 5

Soft Shaped Tortilla Procedure 3

1.) Ingredients were combined in mixer
2.) These were mixed 4-10 minutes on medium speed
3.) The dough was allowed to rest five minutes
4.) The dough was divided into 40 gram balls
5.) The dough balls were pressed in tortilla press @400° F. (~205° C.) for 1-3 seconds
6.) These were baked in tortilla oven @400° F. (~205° C.) for 30-90 seconds
7.) The baked tortillas were pressed into male and female moulds of desired shapes
8.) These were cooled, while still in the moulds, five minutes on cooling rack
9.) The soft shaped tortillas were packaged
10.) Final tortilla moisture content was measured at 23-28%, Water Activity at <0.88

Example 6

Soft Shaped Tortilla Procedure 4

1.) Ingredients were combined in mixer
2.) These were mixed 4-10 minutes on medium speed 3.) The dough was allowed to rest five minutes
4.) The dough was sheeted to a thickness of 1-3 mm
5.) The sheeted dough was folded around male mould
6.) The sheeted dough was cut around male mould
7.) The sheeted dough was pressed into female mould
8.) The dough was in heated in the preheated moulds at 400° F. (~205° C.) for 1-3 seconds
9.) The shapes were removed from the moulds and baked in tortilla oven @ 400° F. (~205° C.) for 30-90 seconds
10.) The shapes were cooled five minutes on cooling rack
11.) The soft shaped tortillas were packaged
12.) Final tortilla moisture content was measured at 23-28%, Water Activity at <0.88

Example 7

Soft Shaped Tortilla Procedure 5

1.) Ingredients are combined in mixer
2.) These are mixed 1-10 minutes on medium speed
3.) Dough or batter is injected into preheated mould at 400° F. (~205° C.) for 1-3 seconds.
4.) The shapes are removed from mould.
5.) The shapes are baked in tortilla oven @400° F. (~205° C.) for 30-90 seconds
6.) The shapes are cooled 5 minutes on cooling rack
7.) The soft shaped tortillas are packaged
8.) Final tortilla moisture content is measured at 23-28%, Water Activity at <0.88

Example 8

Soft Shaped Tortilla Procedure 6

1.) Ingredients are combined in mixer
2.) These are mixed 1-10 minutes on medium speed
3.) Dough or batter is injected into preheated mould at 400° F. (~205° C.) for 3-20 seconds.
4.) The shapes are removed from mould
5.) The shapes are cooled 5 minutes on cooling rack
6.) The soft shaped tortillas are packaged
7.) Final tortilla moisture content is measured at 23-28%, Water Activity at <0.88

The invention has been described herein, with reference to certain preferred embodiments, in order to assist the reader in practicing the invention without undue experimentation. However, a person having ordinary skill in the art will readily recognize that many of the components and parameters can be varied or modified to a certain extent without departing from the essence of the invention. Furthermore, titles, headings, or the like are provided to enhance the reader's comprehension of this document, and should not be read as limiting the scope of the present invention.

The entire disclosures of any patent applications, patents, and publications, cited above and below, if any, are hereby incorporated by reference in their entirety. Any discussion of such disclosures throughout the specification should in no way be considered as an admission that such disclosure is widely known or forms part of common general knowledge in the field.

Throughout this specification, and any sections which follow, unless the context requires otherwise, the words "comprise," "comprising" and the like, are to be construed in an inclusive sense as opposed to an exclusive sense, that is to say, in the sense of "including, but not limited to".

We claim:

1. A method of preparing a baked soft shaped tortilla piece packaged food article, comprising the steps of:
   A. providing a quantity of a chemically leavened gluten plastic dough, the dough including:
      about 55 to 80% by dry weight flour,
      about 1% to about 10% sugar,
      about 4% to about 15% humectant,
      about 1% to about 15% fat,
      about 1% to about 5% salt, and
      about 30% to about 35% moisture;
   B. forming the quantity into shaped, heat set three dimensional pieces having a thickness of about 1-5 mm;
   C. baking the shaped, heat set pieces to form a plurality of finished soft shaped tortilla pieces each having a moisture content of from about 23% to about 28%, from about 1% to about 15% of an edible fat or shortening ingredient, and having a water activity value of about 0.88 or less, each of the finished soft shaped tortilla pieces having a formed shape selected from a cup, bowl, U- or square bottomed shaped taco shell, boat, tube, envelope or cone; and,
   D. packaging the plurality of finished soft shaped tortilla pieces within a hermetically sealed, modified atmosphere package to form soft shaped tortilla piece packaged food article having a shelf life of at least six months at room temperature storage, wherein the plurality of baked soft shaped tortilla pieces has a shelf life of at least six months at room temperature storage within the hermetically sealed food package while still remaining flexible and pliable.

2. The method of claim 1 wherein the at least a majority of the flour is wheat flour.

3. The method of claim 1 wherein the dough is a rested farinaceous dough.

4. The method of claim 3 wherein the dough has a Brabender value ranging from about 500 to 1000 BU, and wherein each piece in step B ranges from about 40-60 g.

5. The method of claim 4 wherein the forming step is practiced in a mold heated to about 190° C. to 205° C.

6. The method of claim 5 wherein forming step is practiced to form a par-baked intermediate food item and the baking step is practiced in a belt oven.

7. The method of claim 1 wherein the soft shaped tortilla pieces have a moisture content of 25% or less.

8. The method of claim 1 wherein the finished soft shaped tortilla piece has a formed shape of a boat.

9. The method of claim 1 wherein the finished soft shaped tortilla piece has a formed shape that is a boat in the shape of a canoe.

10. A method of preparing a baked soft shaped tortilla piece packaged food article, comprising the steps of:
    A. providing a quantity of a chemically leavened gluten plastic dough, the dough including:
       55 to 80% by dry weight flour;
       1% to 10% sugar,
       4% to 15% humectant,
       1% to 15% fat,
       1% to 5% salt, and
       30% to 35% moisture;
    B. forming the quantity into shaped, heat set three dimensional pieces having a thickness of 1-5 mm;
    C. baking the shaped, heat set pieces to form a plurality of finished soft shaped tortilla pieces each having a moisture content of from 23% to 28%, from 1% to 15% of an edible fat or shortening ingredient, and having a water activity value of 0.88 or less, each of the finished soft shaped tortilla pieces having a formed shape selected from a cup, bowl, U- or square bottomed shaped taco shell, boat, tube, envelope or cone; and, D. packaging the plurality of finished soft shaped tortilla pieces within a hermetically sealed, modified atmosphere package to form soft shaped tortilla piece packaged food article configured to have a shelf life of at least six months at room temperature storage, wherein the plurality of baked soft shaped tortilla pieces are configured to have a shelf life of at least six months at room temperature storage within the hermetically sealed food package while still remaining flexible and pliable.

11. The method of claim 10, wherein the soft shaped tortilla pieces have a moisture content of from 26% to 28%.

12. The method of claim 10, wherein baking is conducted for 2-4 minutes.

13. A method of preparing a baked soft shaped tortilla piece packaged food article, comprising the steps of:

A. providing a quantity of a chemically leavened gluten plastic dough, the dough including:
55 to 80% by dry weight flour;
1% to 10% sugar,
4% to 15% humectant,
1% to 15% fat,
1% to 5% salt, and
30% to 35% moisture;

B. forming the quantity into shaped, heat set three dimensional pieces having a thickness of 1-5 mm;

C. baking the shaped, heat set pieces to form a plurality of finished soft shaped tortilla pieces each having a moisture content of from 23% to 28%, from 1% to 15% of an edible fat or shortening ingredient, and having a water activity value of 0.88 or less, each of the finished soft shaped tortilla pieces having a formed shape selected from a cup, bowl, U- or square bottomed shaped taco shell, boat, tube, envelope or cone; and, D. packaging the plurality of finished soft shaped tortilla pieces within a hermetically sealed, modified atmosphere package to form soft shaped tortilla piece packaged food article configured to have a shelf life of at least six months at room temperature storage, wherein the plurality of baked soft shaped tortilla pieces are configured to have a shelf life of at least six months at room temperature storage within the hermetically sealed food package while still remaining flexible and pliable, wherein the finished tortilla pieces are configured to remain semi-rigid to hold the formed shape for at least six months at room temperature.

* * * * *